US005704585A

United States Patent [19]

Hrytzak et al.

[11] Patent Number: 5,704,585

[45] Date of Patent: Jan. 6, 1998

[54] ELECTRICAL CONNECTION BETWEEN CLOSURE CAP AND INTERNAL ACTUATOR OF AN ELECTRICALLY ACTUATED VALVE

[75] Inventors: Bernard J. Hrytzak, Chatham, Canada; Takeshi Gomi, Saitama, Japan; Hirotomi Nemoto, Saitama, Japan; Yoshio Yamamoto, Saitama, Japan

[73] Assignees: Siemens Electric Limited, Ontario, Canada; Honda Giken Kogyo Kabushiki Kaisha, Tokyo, Japan

[21] Appl. No.: 520,542

[22] Filed: Aug. 29, 1995

[51] Int. Cl.$^6$ .................................................... F16K 31/06

[52] U.S. Cl. ................................ 251/129.01; 251/129.15

[58] Field of Search ......................... 251/129.15, 129.01; 335/257

[56] References Cited

U.S. PATENT DOCUMENTS

| | | | |
|---|---|---|---|
| 5,275,478 | 1/1994 | Schmitt et al. | 251/129.15 X |
| 5,435,519 | 7/1995 | Everingham . | |
| 5,481,237 | 1/1996 | Sarfati et al. | 251/129.15 X |
| 5,577,705 | 11/1996 | Torrence | 251/129.15 |

FOREIGN PATENT DOCUMENTS

| | | |
|---|---|---|
| 32 20 090.0 | 5/1982 | Germany . |
| 38 27 070.6 | 8/1988 | Germany . |
| 93 00 905 U | 1/1993 | Germany . |
| WO 95/19497 | 7/1995 | WIPO . |

OTHER PUBLICATIONS

International Search Report dated 23 Dec. 1996 from corresponding application PCT/CA 96/00561.

*Primary Examiner*—Kevin Lee

[57] ABSTRACT

An improved electrical connection is provided between terminals (T) mounted in a sensor cap (26) that closes an otherwise open end of a cylindrical EEGR valve body shell (24), and terminals (98, 99) mounted in sockets (100, 102) on a solenoid coil assembly (70) that operates the EEGR valve from an engine electrical control that is connected via a wiring harness connector plug mating with an external plug of sensor cap (26) containing terminals (T). The end portions of terminals (T) that mate with terminals (98, 99) are forked blades having reduced thickness from an adjoining portion, thereby providing greater resilient flexibility for a better and more reliable electrical connection.

6 Claims, 6 Drawing Sheets

ELECTRICAL CONNECTION BETWEEN CLOSURE CAP AND INTERNAL ACTUATOR OF AN ELECTRICALLY ACTUATED VALVE

FIELD OF THE INVENTION

This invention relates to an electrically actuated valve in which one or more electrical terminals in a closure cap mate with one or more electrical terminals of the valve's electric actuator.

BACKGROUND AND SUMMARY OF THE INVENTION

Many electrically actuated valves are subjected to rather harsh operating environments. Even though internal electrical connections may be protected by being enclosed within such a valve, some types of valves are subject to operation over a wide range of temperature extremes and to substantial mechanical vibrations. Valves that are used in automotive vehicles are in this category and those that are mounted on, or in proximity to, a vehicle's engine are apt to experience perhaps the harshest environment. One such valve is an electric exhaust gas recirculation (EEGR) valve of the type used in exhaust emission control of internal combustion engines.

Exhaust gas recirculation is a technique that is used to reduce the oxides of nitrogen content of internal combustion engine exhaust gases. An EGR valve controls the amount of exhaust gas that is allowed to recirculate and mix with a fresh air-fuel induction stream that enters combustion chamber space of an engine, and is typically mounted directly on the engine. One type of electric actuator for such a valve is a solenoid actuator. The solenoid assembly comprises a bobbin-mounted electromagnet coil that is electrically connected to terminals of an electrical connector plug via which the valve electrically connects to an electrical control system for the engine.

While ends of the magnet wire are often directly attached to such terminals, the invention is distinguished by providing for the magnet wire ends to be directly attached to bobbin-mounted terminals which in turn mate with terminals mounted in a closure of the valve, such as an end cap. Ends of the closure-mounted terminals that are opposite those mated with the bobbin-mounted terminals are surrounded by a shell integrally formed in the closure to create the electric connector plug via which the valve connects to the engine electrical control system.

The invention relates to a novel construction for such electrical connection of closure-mounted terminals to actuator-mounted terminals which provides greater assurance of integrity of the electrical connections when the valve is in use while allowing the mating to occur as the closure is being assembled to the valve. Thus, the invention combines assembly convenience with a reliable electrical connection between mating terminals.

The foregoing, along with further advantages, features, and benefits of the invention, and the inventive principles are disclosed in the ensuing description of details of a specific embodiment that represents the best mode contemplated at this time for carrying out the invention. The drawings that accompany the disclosure depict in particular detail a presently preferred exemplary embodiment of the invention.

DESCRIPTION OF THE PREFERRED EMBODIMENT

Figure 1:
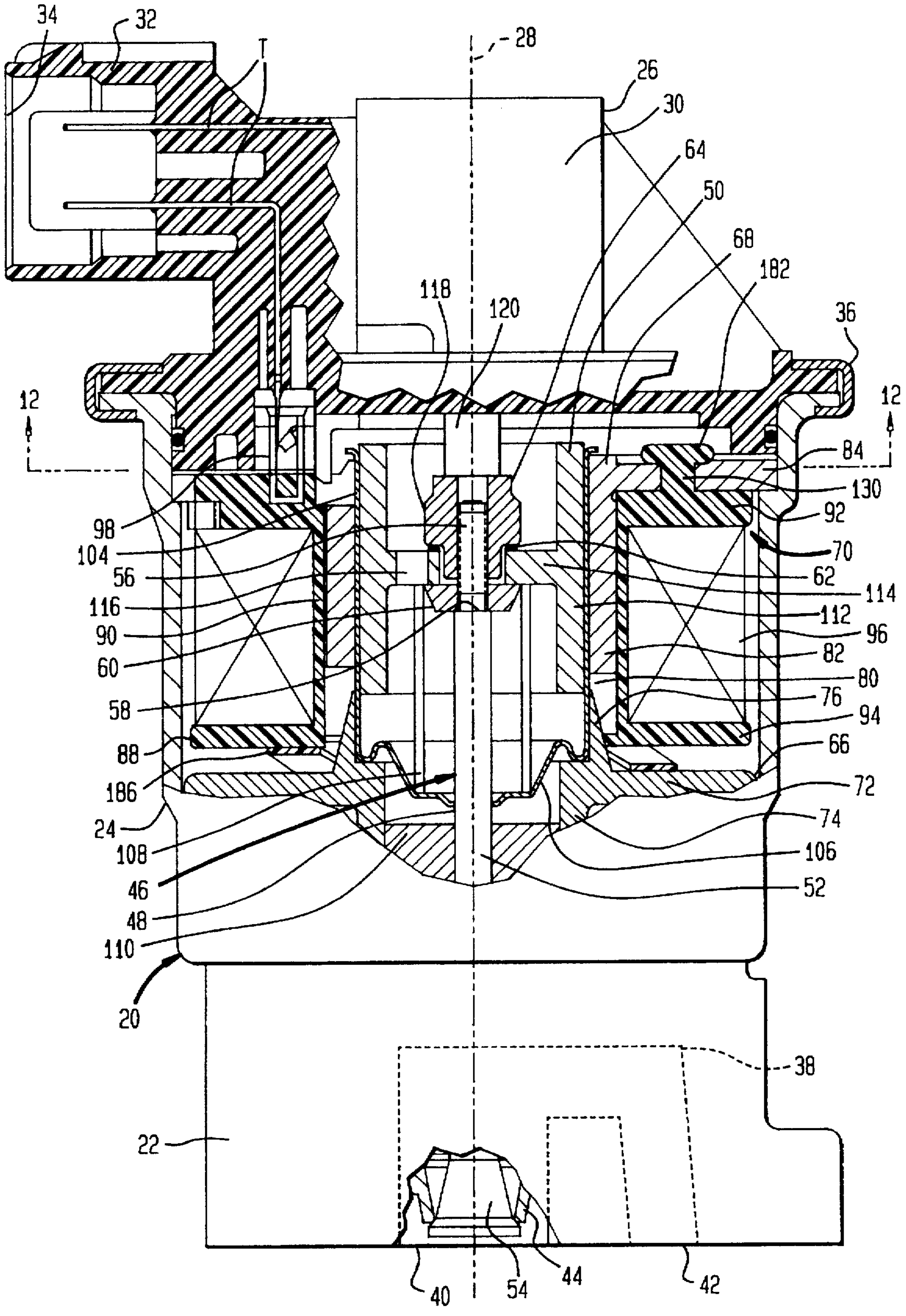
FIG. 1 is a longitudinal view, partly in cross section, of an electric EGR valve (EEGR valve) embodying principles of the invention.

The drawing Figs. illustrate principles of the present invention in an exemplary electric EGR valve (EEGR valve) 20. FIG. 1 shows the general arrangement of EEGR valve 20 to comprise a metal base 22, a generally cylindrical metal shell 24 disposed on top of and secured to base 22, and a sensor cap 26 forming a closure for the otherwise open top of shell 24.

Base 22 comprises a flat bottom surface adapted to be disposed against a surface of an exhaust manifold of an internal combustion engine, typically sandwiching a suitably shaped gasket (not shown) between itself and the manifold. Base 22 comprises a flange having through-holes (not shown) that provide for the separable attachment of EEGR valve 20 to an exhaust manifold. For example, the manifold may contain a pair of threaded studs which pass through the flange through-holes and onto the free ends of which lock washers are first placed, followed by nuts that are threaded onto the studs and tightened to force base 22 toward the manifold, thereby creating a leak-proof joint between valve 20 and the manifold. Reference numeral 28 designates a main longitudinal axis of EEGR valve 20.

Sensor cap 26 is a non-metallic part, preferably fabricated from suitable polymeric material. In addition to providing a closure for the otherwise open top end of shell 24, sensor cap 26 comprises a central cylindrical tower 30 and an electrical connector shell 32 that projects radially outwardly from tower 30. Tower 30 has a hollow interior shaped to house a position sensor that is utilized for sensing the extent to which EEGR valve 20 is open. Sensor cap 26 further contains several electrical terminals T that provide for a solenoid coil assembly (to be described later) and such a sensor to be operatively connected with an engine electrical control system. Ends of terminals T are surrounded by shell 32 to form an electrical connector plug 34 that is adapted to mate with a mating plug (not shown) of an electrical wiring harness of an engine electrical control system. A metal clinch ring 36 securely attaches sensor cap 26 to shell 24.

Base 22 comprises an exhaust gas passageway 38 having an entrance 40 coaxial with axis 28 and an exit 42 that is spaced radially from entrance 40. Both entrance 40 and exit 42 register with respective passages in an engine exhaust manifold.

A valve seat 44 is disposed in passageway 38 coaxial with entrance 40. An armature-pintle assembly 46 that is also coaxial with axis 28 comprises a pintle 48 and an armature 50. Pintle 48 comprises a shaft 52 having a valve head 54 at the lower end and a threaded stud 56 at the upper end, and a shoulder 58. Valve head 54 is shaped for cooperation with an annular seat surface provided in seat 44 by a central through-opening in seat 44. Threaded stud 56 provides for attachment of pintle 48 to armature 50 by attachment means that includes an annular shim 60, a wave spring washer 62, and a nut 64. FIG. 1 depicts the closed position of EEGR valve 20 wherein valve head 54 is seated closed on seat 44. EEGR valve 20 further comprises a lower stator member 66, an upper stator member 68, and a solenoid coil assembly 70. Lower stator member 66 comprises a circular flange 72 immediately below which is a smaller diameter cylindrical wall 74 and immediately above which is a tapered cylindrical wall 76. A through-hole extends centrally through member 66 and comprises a right angle shoulder at the base of wall 76 where it joins with flange 72.

Figure 2:
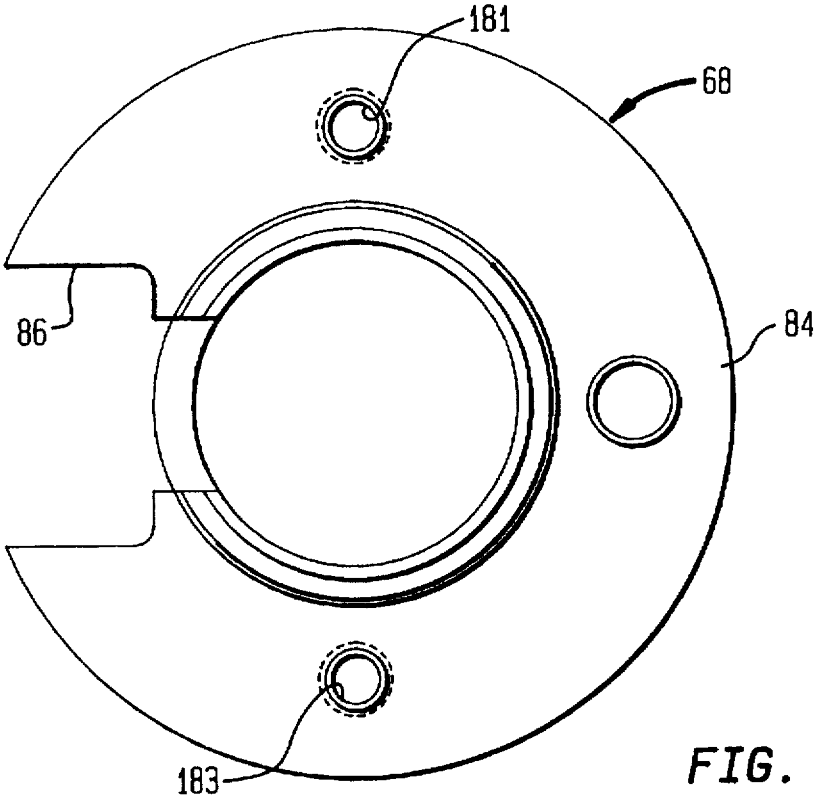
FIG. 2 is a top plan view of one of the parts of the EEGR valve shown by itself, namely an upper stator member.

Upper stator member 68 is cooperatively associated with lower stator member 66 to provide an air gap 80 in the magnetic circuit. Member 68 comprises a straight cylindrical side wall 82 having a flange 84 extending around its outside proximate its upper end. A slot 86 (FIG. 2) in a portion of flange 84 provides a clearance for an electrical connection from solenoid coil assembly 70 to certain terminals T of connector plug 34.

Solenoid coil assembly 70 is disposed within shell 24 between stator members 66 and 68. Solenoid coil assembly 70 comprises a non-metallic bobbin 88 having a straight cylindrical tubular core 90 coaxial with axis 28, and upper and lower generally circular flanges 92, 94 respectively at the opposite axial ends of core 90. A length of magnet wire MW is wound on core 90 between flanges 92, 94 to form an electromagnet coil 96.

Bobbin 88 is preferably an injection-molded plastic that possesses dimensional stability over a range of temperature extremes that are typically encountered in automotive engine usage. Two electrical terminals 98, 99 (only 98 appearing in FIG. 1) are mounted in respective upwardly open sockets 100, 102 (FIGS. 3, 4, 6, 7) on the upper face of upper bobbin flange 92, and a respective end segment of the magnet wire forming coil 96 is electrically connected to a respective one of the terminals 98. Further details of solenoid coil assembly 70 will be described later.

A portion of armature 50 axially spans air gap 80, radially inward of walls 76 and 82. A non-magnetic sleeve 104 is disposed in cooperative association with the two stator members 66, 68 and armature-pintle assembly 46. Sleeve 104 has a straight cylindrical wall to keep armature 50 separated from the two stator members 66, 68. Sleeve 104 also has a lower end wall 106 that is shaped to provide a cup-shaped spring seat for seating a lower axial end of a helical coil spring 108, to provide a small circular hole for passage of pintle shaft 52, and to provide a stop for limiting the downward travel of armature 50.

Guidance of the travel of armature-pintle assembly 46 along axis 28 is provided by a central through-hole in a bearing guide member 110 that is press fit centrally to lower stator member 66. Pintle shaft 52 has a precise, but low friction, sliding fit in the bearing guide member hole.

Armature 50 is ferromagnetic and comprises a cylindrical wall 112 coaxial with axis 28 and a transverse internal wall 114 across the interior of wall 112 at about the middle of the length of wall 112. Wall 114 has a central circular hole that provides for the upper end of pintle 48 to be attached to armature 50 by fastening means that includes shim 60, wave spring washer 62, and nut 64. Wall 114 also has smaller bleed holes 116 spaced outwardly from, and uniformly around, its central circular hole.

Shim 60 serves to provide for passage of the upper end portion of pintle 48, to provide a locator for the upper end of spring 108 to be substantially centered for bearing against the lower surface of wall 114, and to set a desired axial positioning of armature 50 relative to air gap 80.

The O.D. of nut 64 comprises straight cylindrical end portions between which is a larger polygonally shaped portion 118 (i.e. a hex). The lower end portion of nut 64 has an O.D. that provides some radial clearance to the central hole in armature wall 114. When nut 64 is threaded onto threaded stud 56, wave spring washer 62 is axially compressed between the lower shoulder of hex 118 and the surface of wall 114 surrounding the central hole in wall 114. The nut is tightened to a condition where shoulder 58 engages shim 60 to force the flat upper end surface of shim 60 to bear with a certain force against the flat lower surface of wall 114. Nut 64 does not however abut shim 60. Wave spring washer 62 is, at that time, not fully axially compressed, and this type of joint allows armature 50 to position itself within sleeve 104 to better align to the guidance of the pintle that is established by bearing guide member 110. Hysteresis is minimized by minimizing any side loads transmitted from the pintle to the armature, or from the armature to the pintle, as the valve operates. The disclosed means for attachment of the pintle to the armature is highly effective for this purpose.

The closed position shown in FIG. 1 occurs when solenoid coil assembly 70 is not being energized by electric current from the engine electrical control system. In this condition, force delivered by spring 108 causes valve head 54 to be seated closed on seat 44. A plunger 120 associated with the position sensor contained within tower 30 of sensor cap 26 is self-biased against the flat upper end surface of nut 64.

As solenoid coil assembly 70 is increasingly energized by electric current from the engine control system, magnetic flux increasingly builds in the magnetic circuit comprising the two stator members 66, 68 and shell 24, interacting with armature 50 at air gap 80 through non-magnetic sleeve 104. This creates increasing magnetic downward force acting on armature 50, causing valve head 54 to increasingly open exhaust gas passageway 38 to flow. Bleed holes 116 assure that air pressure is equalized on opposite sides of the armature as the armature moves. Concurrently, spring 108 is being increasingly compressed, and the self-biased plunger 120 maintains contact with nut 64 so that the position sensor faithfully follows positioning of armature-pintle assembly 46 to signal to the engine control system the extent to which the valve is open.

Further detail of solenoid coil assembly 70 will be presented. Lower bobbin flange 94 has a circular shape whose outer perimeter is interrupted at one location by a small inwardly extending slot 124. Upper flange 92 also has a circular shape, but its outer perimeter is interrupted by two closely adjacent slots 126 and 128 that have somewhat different shapes.

The upper face of flange 92 contains two upstanding cylindrical posts 130 and 132 that are diametrically opposite each other and equidistant from axis 28 and whose upper ends are tapered.

The pair of side-by-side, walled sockets 100, 102 are disposed upright on the upper face of flange 92. Each socket is adapted for receiving a respective one of the two identical electric terminals 98, 99, (the former being depicted in FIGS. 8–11 to be described in detail later) to provide for the electrical connection of a respective terminal with a respective end segment of magnet wire MW wound on bobbin 88.

Each socket has a generally rectangular wall that is open at the top for insertion of an electric terminal. The sockets are disposed at ninety degrees between posts 130, 132. The opposed radially inner and radially outer portions of each socket wall contain straight narrow slots 138 and 140 respectively that are in parallel and mutual alignment across the respective socket. The slots are open at the top where they have a lead that facilitates the passage of respective segments of the coil magnet wire into the slots, as will be explained in greater detail later on. A respective grooved track 142 arid 144 ramps upwardly from a respective slot 126, 128 to the bottom of the radially outer slot 140 of a respective socket 100, 102. Integral formations 150 serve to rigidify the sockets to flange 92. The upper rectangular rim of each socket has a chamfer 152 to facilitate terminal insertion, and each socket has shallow axial grooves 153 proximate its four corners.

Figure 8:
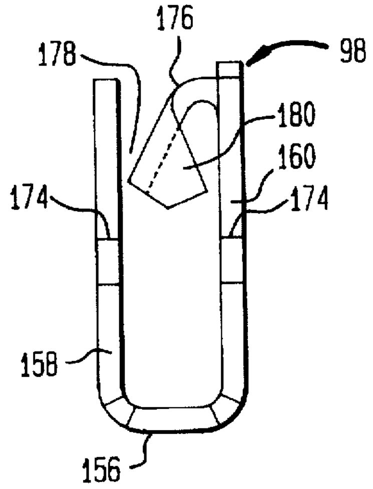
FIG. 8 is a front elevation view of an electrical terminal shown by itself prior to association with the bobbin.
Figure 10:
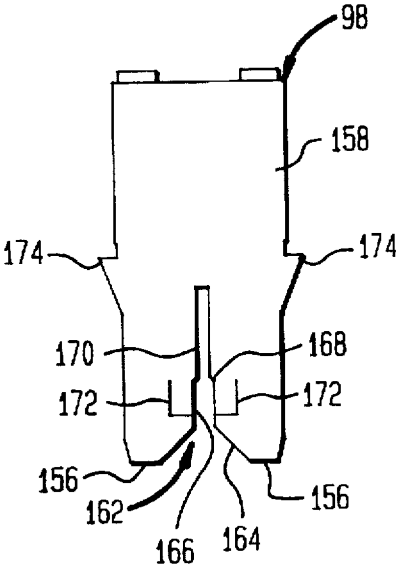
FIG. 10 is a right side elevation view of FIG. 8.
Figure 11:
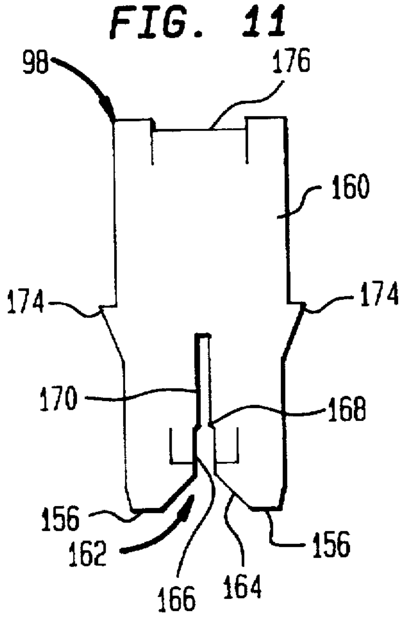
FIG. 11 is a left side elevation view of FIG. 8.

FIGS. 8–11 illustrate electric terminal 98 prior to its insertion into a respective one of the sockets 100, 102. Terminal 98 is fabricated as a single piece from flat strip stock to comprise a generally U-shaped body having a base 156 whose opposite ends join with flat sides 158 and 160 respectively along 90 degree radii, as shown by FIG. 8. Each side contains a centrally located axial slot 162 that is open at base 156 and extends upwardly therefrom for about one-half the overall axial length of the side. At base 156, a slot 162 comprises an entrance lead 164 that extends to a straight section 166 which in turn extends via a tapered section 168 to a narrower straight section 170. The material is slit, as shown at 172 in FIGS. 10 and 11, adjacent each side of section 166. The outer edges of sides 158, 160 contain pointed retention barbs 174. A somewhat T-shaped tab 176 inclines downwardly and inwardly from the central portion of the top edge of side 160, stopping short of the opposite side 158 to provide an insertion space 178 for a mating terminal T of sensor cap 26. The wings 180 of the T-shape are curled back toward, but stop short of, side 160.

Magnet wire MW that forms coil 96 extends from slot 138 of socket 100 and across the socket's interior to exit the socket by passing through slot 140. From slot 140 the magnet wire runs in and along the groove of ramped track 142 to enter slot 126 where it loops around the edge of the slot to the bottom face of flange 92 where it is wound around the core between flanges 92, 94 to ultimately create electromagnet coil 96. From the final convolution of the coil, the magnet wire extends to slot 128 where it loops around the edge of the slot to the upper face of flange 92. The magnet wire extends from slot 128 to run in and along the groove in ramped track 144 and thence enter socket 102 by passing through slot 140 of that socket. The magnet wire passes across the interior of the socket to the opposite slot 138. At all times during the running of the magnet wire on the bobbin, it is kept tensioned so that not only are the coil convolutions tensioned, but also the segments that extend from coil 96 to the two sockets.

Figure 4:
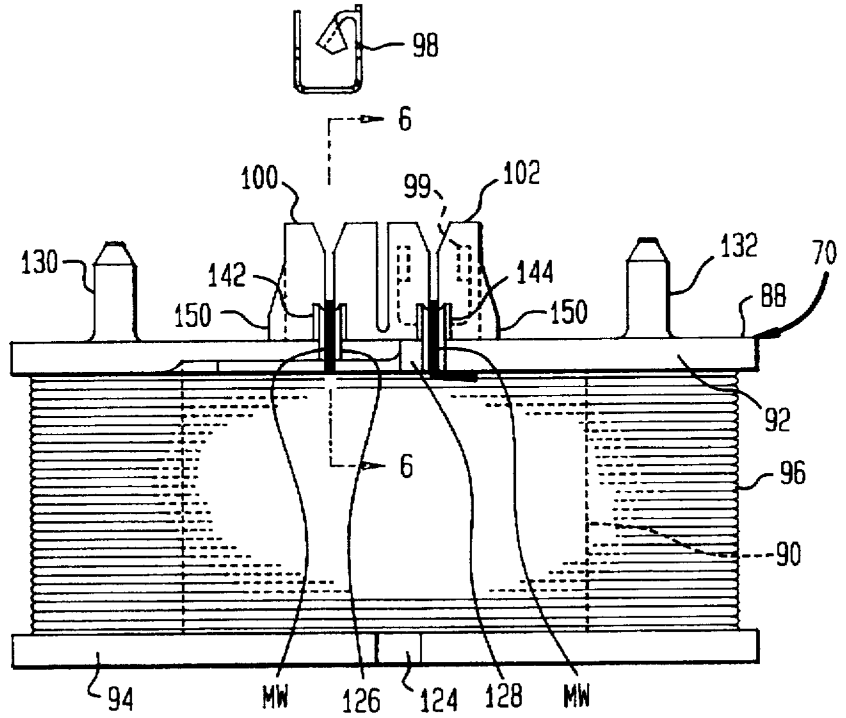
FIG. 4 is a left side elevation view of FIG. 3.
Figure 9:
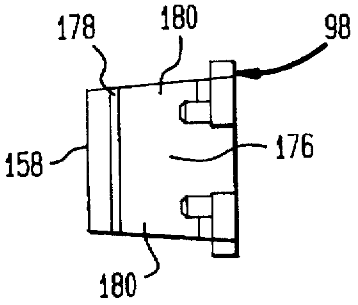
FIG. 9 is a top plan view of FIG. 8.

Terminals 98, 99 are then assembled by aligning each with the open end of a respective socket 100, 102 and forcefully inserting them into the sockets. Although FIG. 4 shows terminal 99 inserted into socket 102 and terminal 98 poised for insertion into socket 100, it is more efficient to simultaneously insert both terminals into their sockets.

As a terminal is being inserted into a socket, the portion of the magnet wire spanning the interior of the socket enters slots 162. Leads 164 facilitate entry into the narrow portions of the slots. When the terminal has been fully inserted, the magnet wire is lodged in section 170 in electric contact with the terminal. Each slot is dimensioned in relation to the diameter of the magnet wire to scrape away the thin insulation covering the magnet wire so that the electric contact is thereby established. Barbs 174 embed slightly into the wall of the socket to securely retain the terminal in the socket. The tensioned magnet wire running across the interior of each socket is also wedged in the terminal slots so that the magnet wire is maintained in tension.

Figure 5:
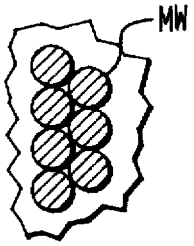
FIG. 5 is an enlarged fragmentary cross section view through a portion of the electromagnet coil taken in the general direction of arrows 5—5 in FIG. 3.
Figure 7:
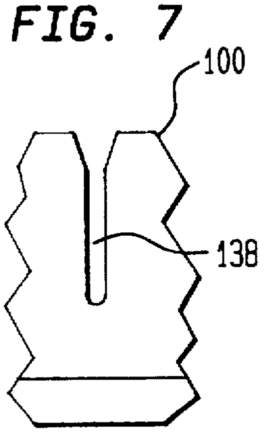
FIG. 7 is a full left side view of FIG. 6 on the same scale.
Figure 6:
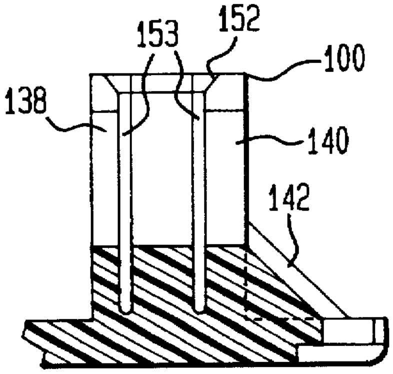
FIG. 6 is a fragmentary cross section view taken in the direction of arrows 6—6 in FIG. 4 on a larger scale.
Figure 3:
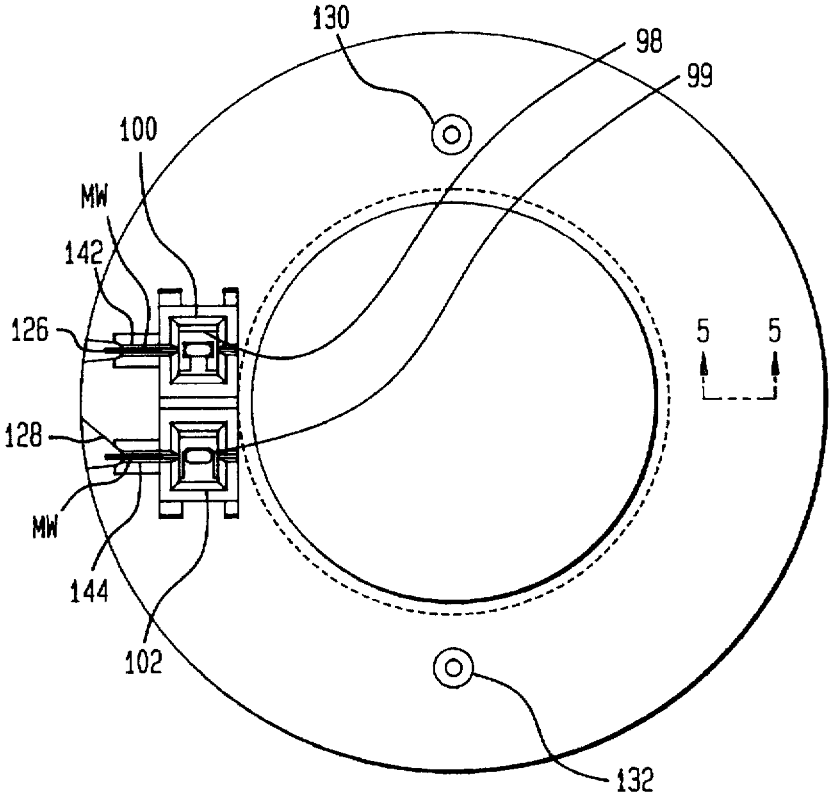
FIG. 3 is a top plan view of another of the parts of the EEGR valve shown by itself, namely a solenoid coil assembly.

By "precision winding" of coil 96, as shown in FIG. 5, maximum convolutions are placed in minimum space, and they are accurately located so that the electromagnetic characteristics of the coil are accurately defined.

The two posts 130, 132 provide for mounting of the bobbin-mounted coil directly on upper stator member 68. Flange 84 contains two through-holes 181, 183 spaced diametrically opposite each other and at ninety degrees to slot 86. The upper face of flange 92 is disposed flat against the lower face of flange 84 with posts 130, 132 extending through the respective through-holes 181, 183. The tapered ends of the posts are then deformed by any suitable plastic deformation process to create mushroom heads 182 (FIG. 1) that bear against the upper face of flange 84. It should be noted that FIG.1 shows one post and its head ninety degrees out of position circumferentially, for illustrative clarity only. A wave spring washer 186 is disposed around the outside of wall 76 and slightly compressed between the lower bobbin flange and flange 72 of lower stator member 66. Wave spring washer 186 serves to assure that upper bobbin flange 92 is maintained against upper stator flange 84 should there be any looseness in the bobbin flange attachment to the upper stator flange.

Figure 12:
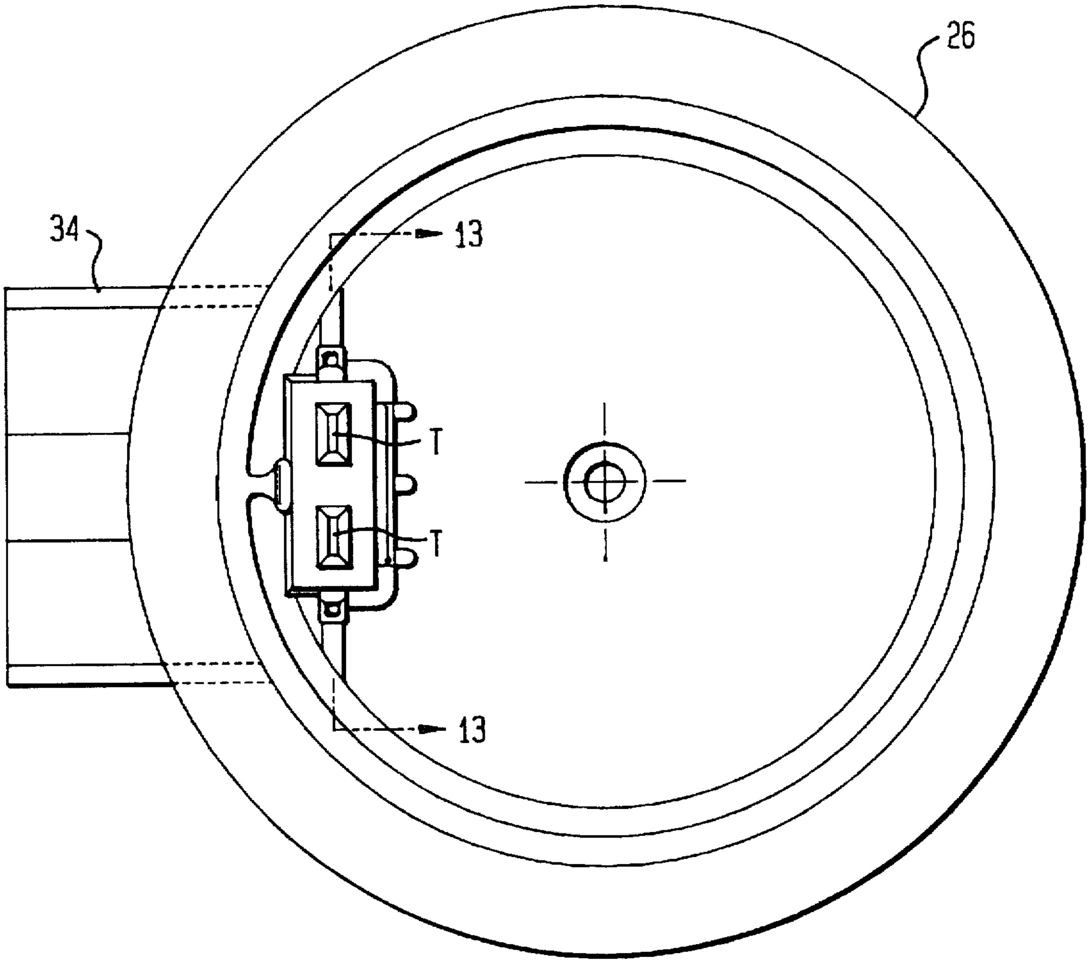
FIG. 12 is a view generally in the direction of arrows 12—12 in FIG. 1, showing a bottom plan view of another part, namely a sensor cap.
Figure 13:
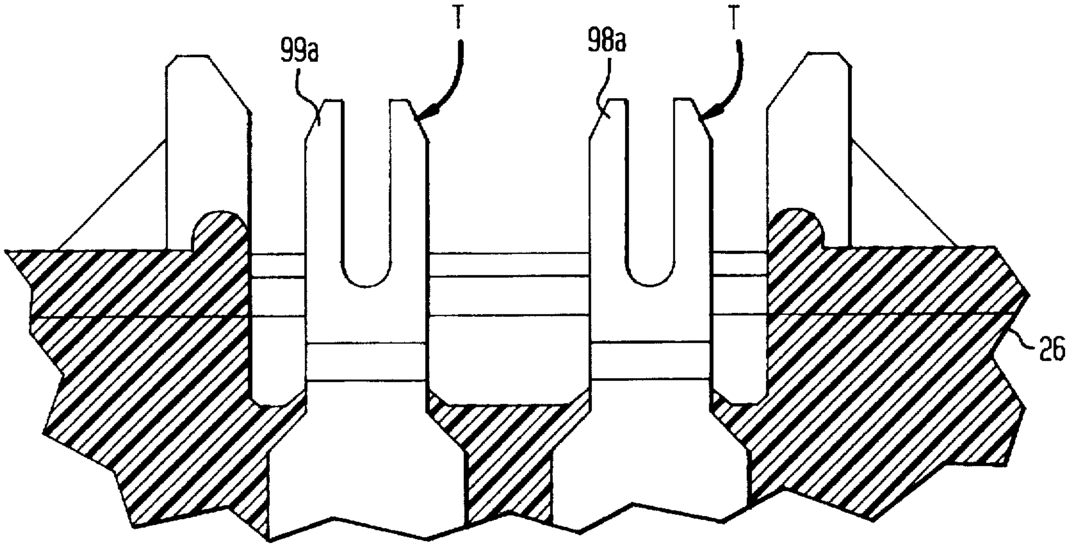
FIG. 13 is a view in the direction of arrows 13—13 in FIG. 12 on a larger scale.
Figure 14:
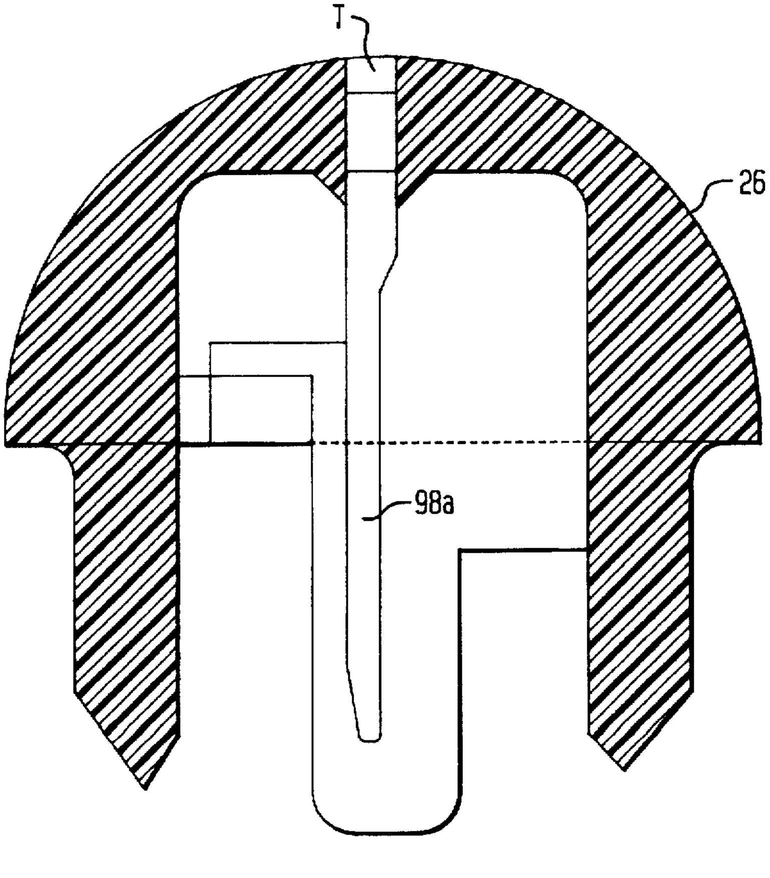
FIG. 14 is a fragmentary view, on an enlarged scale, in the same direction as the view of FIG. 1, illustrating further detail of the sensor cap, and its electrical terminals.

FIGS. 12–14 show detail of sensor cap 26 and terminals T.

The ends of respective terminals T which mate respectively with terminals 98, 99, as depicted in FIG. 1, are forked blades 98*a*, 99*a*. When so mated, the forked blades fit into the space 178 of the respective terminal 98, 99 between side 158 and tab 176. Importantly, the forked blade portions are of a reduced thickness from that of the respective adjoining portions of the respective terminals T. A detailed profile appears in FIG. 14 to show this reduced thickness. The reduced thickness serves to impart a greater degree of resilient flexibility to the forked blade portions so that as they are being inserted into a respective space 176 during assembly of closure cap 26 to close shell 24, they will flex significantly more than the thicker tab 176. This not only facilitates the assembly process, but also makes for a better, more reliable electric connection, which is especially important in an EEGR valve.

While the foregoing has disclosed a presently preferred embodiment of the invention, it should be understood that the inventive principles are applicable to other equivalent embodiments that fall within the scope of the following claims.

What is claimed is:

1. An electrically actuated valve comprising valve body structure containing a valve mechanism and an electric actuator for operating said valve mechanism, said valve body structure having an interior and an exterior and comprising a body member that comprising at least one electric terminal that provides for electrically connecting said electric actuator to an external control, said at least one terminal having one end portion that terminates at the exterior of said valve body structure, each said at least one terminal having an opposite end portion that is disposed within the interior of said valve body structure, said electric actuator comprising at least one electric terminal each mated with a respective terminal on said body member to form a respective mated pair in which one terminal of each respective mated pair comprises a projection comprising a flat blade that is resiliently flexed by being mated with the other terminal of each respective mated pair, the flat blade having a thickness that is less than the thickness of an immediately adjoining portion of the projection.

2. An electrically actuated valve as set forth in claim 1 wherein said one terminal of each respective mated pair is mounted on said body member.

3. An electrically actuated valve as set forth in claim 1 wherein said flat blade is forked.

4. An electrically actuated valve as set forth in claim 1 wherein said at least one terminal on said body member comprises two terminals disposed side-by-side, and said at least one terminal of said electric actuator comprises two terminals disposed in side-by-side sockets that are open for reception of the terminals on said body member.

5. An electrically actuated valve as set forth in claim 4 wherein said body member comprises an end closure cap for closing an otherwise open axial end of said valve body structure.

6. An electrically actuated valve as set forth in claim 1 wherein said valve is an electrically operated exhaust gas recirculation valve for an internal combustion engine.

* * * * *